United States Patent [19] [11] 4,290,159
McLennan et al. [45] Sep. 22, 1981

[54] SPORTSMAN'S RETRIEVER

[75] Inventors: Charles I. McLennan, Goochland; Marshall G. Stokes, Richmond, both of Va.; George J. Konucik, P.O. Box 9482, Richmond, Va. 23228

[73] Assignee: George Joseph Konucik, Richmond, Va.

[21] Appl. No.: 107,335

[22] Filed: Dec. 26, 1979

[51] Int. Cl.³ .............................................. B63C 7/26
[52] U.S. Cl. ................................................. 9/9; 43/25
[58] Field of Search ..................................... 9/9; 43/25

[56] References Cited
U.S. PATENT DOCUMENTS

| 806,730 | 12/1905 | Zoll | 43/25 |
| 2,190,531 | 2/1940 | Kaboskey | 9/9 X |
| 2,968,819 | 1/1961 | Jenson | 9/9 |
| 3,553,751 | 1/1971 | Lewis | 9/9 |
| 3,997,930 | 12/1976 | Reeves | 9/9 |

FOREIGN PATENT DOCUMENTS 270516 1/1930 Italy ............................................ 9/9

Primary Examiner—Trygve M. Blix
Assistant Examiner—John C. Paul

[57] ABSTRACT

An accessory mountable on a fishing rod, rifle or the like, for aiding to retrieve the same, if dropped into deep water; the device including, generally, a canister containing a line wound up around a spool, one end of the line attached to the spool, and the other end of the line being attached to an exterior float, adhered by a water-soluble adhesive to the canister, and a bracket, or other means, for securing the canister to the sportsman's equipment.

1 Claim, 8 Drawing Figures

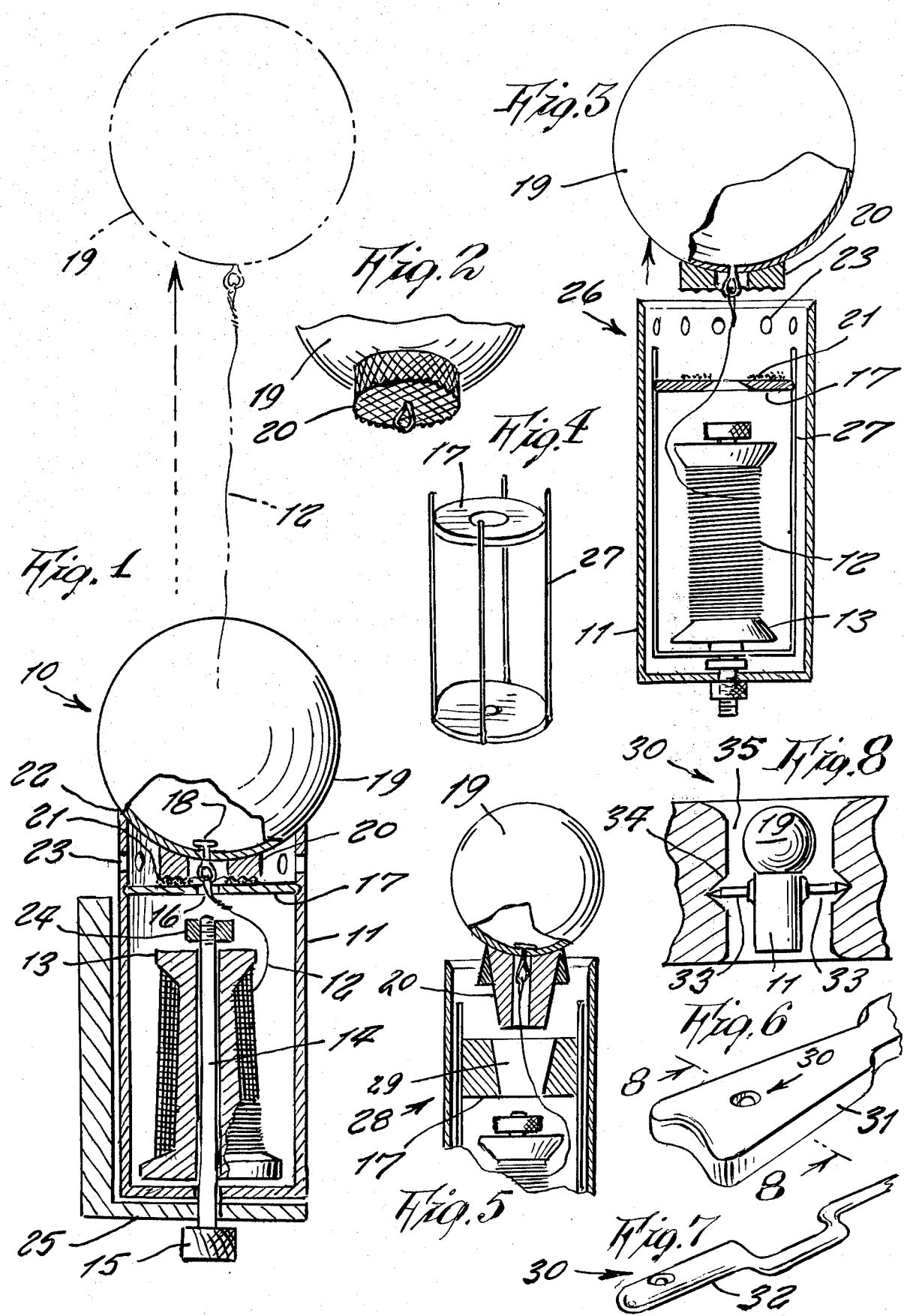

SPORTSMAN'S RETRIEVER

This invention relates generally to accessories for sportsmen's equipment, such as fishing rods, rifles, cameras, and other objects carried out-of-doors in pursuit of the particular sport.

It is well known, that accidents more readily occur when a person is in unfamiliar situations, to which he is not accustomed, such as when away from home on a hunting or fishing excursion. One frequent such accident is the loss of various pieces of equipment, that falls overboard from a boat or the shore into deep water, so that it cannot be readily retrieved. Such equipment may possibly be expensive to replace, and its loss can terminate a current sporting excursion. This situation is, accordingly, in want of a solution.

Therefore, it is a principal object of the present invention, to provide a sportsman's retriever, which, in one design, is readily attachable to the sportsman's equipment, and which, in case the object falls into deep water, will send up a float to the water's surface, the float being attached by a line to the equipment, so that it can then be immediately pulled, so as to retrieve the object.

Another object is to provide a sportsman's retriever, which, in another design, is built into the sportsman's equipment.

Other objects are to provide a sportsman's retriever, which is simple in design, inexpensive to manufacture, rugged in construction, easy to use, and efficient in operation.

These, and other objects, will be readily evident, upon a study of the following specification, and the accompanying drawing, wherein:

FIG. 1 is a side cross-sectional view of one design of the invention;

FIG. 2 is a fragmentary bottom perspective view of the float;

FIG. 3 is a view similar to FIG. 1, and showing a modified design thereof;

FIG. 4 is a perspective view of a spool holder used in FIG. 3;

FIG. 5 is a fragmentary side cross-sectional view of still another modified design;

FIG. 6 is a fragmentary perspective view of a rifle shoulder butt, shown incorporating the invention;

FIG. 7 is a fragmentary perspective view of a fishing pole handle, shown incorporating the invention, and FIG. 8 is an enlarged cross-sectional view, on line 8—8 of FIG. 6, showing the invention pivotally suspended in the butt, so that no matter which side of the rifle rests downward on the water bottom, the float always points upwards, so as to float away therefrom.

Referring now to the drawing in greater detail, and more particularly to FIGS. 1 and 2 thereof at this time, the reference numeral 10 represents a sportsman's retriever, according to the present invention, wherein there is a can 11, containing a strong, thin line 12, wound up around a spool 13, mounted on a spindle 14, extending, at one end, outwardly of the can, and where a knurled knob 15 allows winding up the line. One end of the line is secured to the spool, and the other end thereof extends through a small hole 16 of a removable partition or disc 17, across an upper portion of the can, and the line terminal end is attached to an eyelet 18, mounted on a spherical float 19. A knurled base 20 is integral with the float, and is coated with a watersoluble adhesive 21, which adheres to the upper side of the disc. The float sits in a circular opening formed by the upper edge 22 of the can. Several openings 23, in the can side wall 23, serve to allow water to enter the can, in order to dissolve the adhesive 21, when the device is in use.

Preferably, all components are molded of plastic. It is to be noted, that a jam nut 24 fits an upper end of the spindle, and the spindle extends through an exterior jam nut 25. It is to be further noted, that the spool tapers upwardly so as to allow the line to unwind easily therefrom, in an upwardly direction. The device is mountable, by a suitable bracket or clamp, to any specific equipment.

In use, when the retriever, attached to the equipment, falls in the water, the water enters the can, as the equipment continues to sink downwardly. The water dissolves the adhesive, thus freeing the float, so as to float upwardly to the water surface where it is seen, so that the line can be pulled, in order to raise, and recover, the lost equipment.

In FIGS. 3 and 4, another design 26 of sportsman's retriever is generally the same, but it includes a spool holder 27, to which the disc 17 is fitted, instead of to the can. The spool holder serves as an improvement, wherein, once the line is unwound, the user just removes the exterior jam nut 25, and then removes the spool holder from the can, for easy rotation of the spool and rewinding of the line.

In FIG. 5, still another retriever design 28 has a conical float base 20, that fits in a correspondingly conical hole 29 of a thick disc, so that there is a larger area therebetween, that may be coated with the adhesive 21.

In FIGS. 6, 7 and 8, another design of sportsman's retriever 30 is built into a rifle butt 31, a fishing pole handle 32, or other equipment. It includes any form of the above-described retrievers 10, 26 or 28, and it additionally includes a means whereby the float is always above the can 11, regardless of whichever side of a rifle butt or fishing pole lands on the bottom of a body of water. In this design, the retriever swivels freely, by means of sideward pins 33, integral with the can 11, the pins pivoting in depressions 34, midway of an opening 35 through the gun stock rifle butt or fishing pole handle, the opening 35 being large enough so as to contain the entire retriever, and also allow it to swing upside-down therein.

The manufacturer is free to interchangeably use and modify any of the designs, as preferred.

While various changes may be made in the detail construction, it is understood that such changes will be within the spirit and scope of the present invention, as is defined by the appended claims.

What we now claim is:

1. A sportsman's retriever, comprising, in combination, a can, a line wound on a spool retained inside said can, one end of said line being attached to said spool, and an opposite end of said line being attached to a float temporarily attached to said can by a water-soluble adhesive; said retriever including a means to allow the retriever to be mounted, and to swivel within an opening through a piece of equipment, such as a fishing pole handle or a gun stock, so that the float end of the retriever pivots to be above the spool end at all times, thus permitting the float to move freely toward the surface of the water.

* * * * *